United States Patent [19]

Beall et al.

[11] Patent Number: 4,874,724

[45] Date of Patent: Oct. 17, 1989

[54] ALKALI ZINC ALUMINOPHOSPHATE GLASS-CERAMICS

[75] Inventors: George H. Beall, Big Flats; Joseph E. Pierson, Painted Post; Candace J. Quinn, Corning, all of N.Y.

[73] Assignee: Corning Incorporated, Corning, N.Y.

[21] Appl. No.: 258,673

[22] Filed: Oct. 17, 1988

[51] Int. Cl.$^4$ ........................ C03C 10/02; C03C 3/17; C03C 3/21

[52] U.S. Cl. ........................ 501/10; 501/46; 501/48; 501/73; 501/74

[58] Field of Search ................... 501/10, 3, 48, 44, 46, 501/73, 74

[56] References Cited

U.S. PATENT DOCUMENTS 3,519,445  7/1970  MacDowell et al. ................. 501/10
4,698,318  10/1987  Vogel et al. ......................... 501/10

FOREIGN PATENT DOCUMENTS 1174475  12/1969  United Kingdom ................. 501/10

*Primary Examiner*—Mark L. Bell
*Attorney, Agent, or Firm*—Clinton S. Janes, Jr.

[57] ABSTRACT

This invention is directed to the production of glass-ceramic articles exhibiting an apparent annealing point in excess of 400° C. and excellent resistance to moisture attack, the articles consisting essentially, in mole percent, of:

| | | | |
|---|---|---|---|
| $Li_2O$ | 5–25 | $ZnO$ | 35–50 |
| $Na_2O$ | 0–15 | $Al_2O_3$ | 0.75–6 |
| $K_2O$ | 0–10 | $P_2O_5$ | 29–37. |
| $Li_2O + Na_2O + K_2O$ | 5–25 | | |

4 Claims, No Drawings

ALKALI ZINC ALUMINOPHOSPHATE GLASS-CERAMICS

RELATED APPLICATION

U. S. Application Ser. No. 258,675, filed concurrently herewith by G. H. Beall and C. J. Quinn under the title ZINC-CONTAINING PHOSPHATE GLASSES discloses the formulation of glasses consisting essentially, in mole percent, of 10–35% $R_2O$, wherein $R_2O$ consists of at least two alkali metal oxides in the indicated proportions of 0–25% $Li_2O$, 0–25% $Na_2O$, and 0–25% $K_2O$, 12–55% ZnO, and 28–40% $P_2O_5$.

BACKGROUND OF THE INVENTION

The production of glass-ceramic articles began with U.S. Pat. No. 2,920,971. The conventional method for preparing glass-ceramic articles involves three general steps: first, a glass forming batch, frequently containing a nucleating agent, is melted; second, that melt is cooled to a temperature at least within the transformation range of the glass and, commonly below that temperature, and a glass article of a desired configuration simultaneously shaped therefrom; and, third, that glass article is heat treated at temperatures above the transformation range of the glass to cause the generation of nuclei in the glass upon which crystals are grown in situ. The heat treatment is typically carried out in a controlled manner so that the crystals developed are quite uniform in size and homogeneously distributed throughout the residual glassy matrix. To accomplish this, the glass article is commonly heated to a temperature slightly above the transformation range to form nuclei therein and then heated to a higher temperature to grow crystals on those nuclei.

In general, the crystals will comprise the greater proportion of the final body and the minor proportion of glass remaining will have a composition far different from that of the precursor glass article, inasmuch as the constituents making up the crystals will have been removed therefrom. Because of the very high percentage of crystals present, the properties exhibited by the glass-ceramic body will more nearly mirror those of the crystal phase than those of the initial glass body.

The size, identity, and character of the crystals developed in glass-ceramic articles are governed through a combination of base glass composition and heat treatment. Hence, crystals of a metastable character can be generated; crystals having compositions and structures not strictly conforming to the classic or standard mineral species. To illustrate, solid solutions, such as β-spodumene solid solution $Li_2O \cdot Al_2O_3 \cdot nSiO_2$, are widely found in glass-ceramic bodies and, not infrequently, crystals are developed therein for which there is no authoritative X-ray diffractometry data from the National Bureau of Standards. This situation has led workers in the glass-ceramic field to analogize the crystal structure of an unknown phase to that of a known crystal structure, even though the composition of the unknown phase may be quite remote from that of the analogized crystal.

Whereas in the production of glass-ceramic articles of substantial bulk, a nucleating agent, as such, is normally included in the precursor glass batch to provide the nuclei for the subsequent growth of crystals thereon, that practice is not mandatory. Thus, where desired, a thermally crystallizable glass can be melted and quickly cooled to avoid crystallization. The glass is thereafter comminuted to a finely-divided powder, commonly termed "frit." Upon sintering together into an integral body, surface nucleation occurs which supplies centers for the subsequent growth of crystals as the glass powder is heated to higher temperatures. That practice is particularly useful in preparing coatings and substrate elements of relatively thin cross sections.

U.S. application Ser. No. 258,675, supra, describes the preparation of glass compositions demonstrating low transformation or transition temperatures (Tg), thereby making it possible to conduct melting and forming operations at low temperatures. Hence, those glasses exhibit transition temperatures below 450° C., preferably below 350° C., with working temperatures (temperatures at which the glasses display viscosities of about $10^4$–$10^7$ poises) below 500° C., preferably between 350°–450° C. As can be appreciated, the maximum long term use temperature for such glasses will be below 450° C., typically below 400° C.

The primary objective of the instant invention was to provide means for increasing the upper use temperature of those glasses, i.e., at least above 400° C. and, preferably, above 450° C., while retaining the forming advantages of low transition temperature without sacrificing the excellent chemical durability exhibited by those glasses.

SUMMARY OF THE INVENTION

We have found that the above objective can be achieved through the production of glass-ceramic articles having compositions within a narrow interval of the glass compositions disclosed in U S. application Ser. No. 258,675. Thus, the inventive glass-ceramic articles consist essentially, expressed in terms of mole percent on the oxide basis, of 5–25% $R_2O$, wherein $R_2O$ consists of 5–25% $Li_2O$, 0–15% $Na_2O$, and 0–10% $K_2O$, 35–50% ZnO, 0.75–6% $Al_2O_3$, and 29–37% $P_2O_5$.

Crystallization of the above glass compositions through surface nucleation occurs when the precursor glass bodies are held at temperatures about 100° C. above the transition temperatures thereof. Crystallization can be greatly expedited, however, if an internal nucleating agent such as $AlF_3$, $TiO_2$, or $ZrO_2$ is included in the base glass composition at levels up to 5 mole percent. Furthermore, crystallization appears to proceed more rapidly when the total alkali metal oxide content is increased above 21 mole percent, and/or when the concentration of $Al_2O_3$ is at least 2.5 mole percent, and/or if the $P_2O_5$ level is no higher than 32 mole percent.

In like manner to the glass compositions of Ser. No. 258,675, CaO, MgO, and MnO may be present individually and collectively in amounts up to 10 mole percent. $Cu_2O$, PbO, and SnO may also be included at individual and collective levels up to 15 mole percent. $SiO_2$ may be tolerated in very small amounts up to about 3 mole percent. Nevertheless, the sum of all optional ingredients, exclusive of nucleating agents, will not exceed 20 mole percent, with the preferred compositions containing no more than 10 mole percent.

Crystallization of glass bodies having compositions within the above delineated ranges will take place over the temperature interval between about 400°–500° C. with the predominant crystal phase (and frequently essentially the sole crystal phase) usually having a crystal structure analogous to that possessed by α-cristobalite. No literature references could be found for the X-ray diffraction patterns demonstrated by the crystals present such that the exact chemical formula for those crystals is not irrefutably known. Nevertheless, they are believed to consist of lithium-, zinc-, and/or lead-containing phosphates. Hence, the crystals have been posited to be composed, in the main, of a lithium-containing, zinc orthophosphate having the conjectured formula $LiZnPO_4$, wherein $Na^+$ and/or $K^+$ ions may additionally be present to yield a mixed alkali zinc orthophosphate solid solution. X-ray diffraction analyses have also indicated the presence in certain compositions of small amounts of crystals having structures similar to that of zinc pyrophosphate $Zn_2P_2O_7$. Again, no literature reference could be found providing an X-ray diffraction pattern identical to that exhibited by those crystals. Other crystal species inferred from X-ray diffractometry include $Li_3PO_4$, $Li_2NaPO_4$, $Li_6Zn_4P_4O_{17}$, and $Pb_9(PO_4)_6$.

In like manner to more conventional glass-ceramic articles, crystallization of the precursor glass proceeds more rapidly as the temperature to which the glass is exposed is elevated. For example, exposure times as brief as about 0.25 hour may be sufficient at the upper extreme of the heat treatment temperatures, compared to 24 hours or even longer at temperatures within the cooler region of the heat treatment range. With articles of any significant bulk, care will be exercised in heating the parent glass article above the softening point of the glass; too rapid heating will result in thermal deformation of the article.

The crystallization, which varies from medium-grained to very fine-grained, raises the apparent annealing point of the resulting product very substantially, commonly up to 100° C. higher and frequently more, thereby greatly raising the temperature at which the article exhibits thermal deformation with consequent significant improvement in long term use temperature. Moreover, the chemical durability of the glass-ceramic products is markedly superior to that of the parent glass.

Although a precise conversion of composition intervals expressed in terms of mole percent to ranges expressed in terms of weight percent is not mathematically possible, the following groups provide approximate values of the above composition intervals as calculated in terms of weight percent:

| | | | |
|---|---|---|---|
| $Li_2O$ | 2-10 | ZnO | 30-45 |
| $Na_2O$ | 0-10 | $Al_2O_3$ | 0.75-5 |
| $K_2O$ | 0-10 | $P_2O_5$ | 45-55 |
| $Li_2O + Na_2O + K_2O$ | 5-15 | | |

DESCRIPTION OF THE PREFERRED EMBODIMENTS

Table I reports a number of glass compositions, expressed in terms of mole percent on the oxide basis, illustrating the present invention. Table IA recites the same compositions, but wherein the values of the individual components have been converted to weight percent. The actual batch ingredients for the glasses can comprise any materials, either the oxides or other compounds, which, when melted together, will be converted into the desired oxides in the proper proportions. To illustrate, $Li_2CO_3$ is conveniently employed as the source of $Li_2O$. Because it is not known with which cation(s) it is combined and because the amount included was relatively small, the fluoride content is simply recorded in terms of $AlF_3$, the nucleating agent employed.

The batch materials were compounded, ballmilled together to aid in obtaining a homogeneous melt, and then charged into silica crucibles. After placing lids thereon, the crucibles were introduced into a furnace operating at about 1000° C. and retained within that furnace for about three hours to melt the batch. Each melt was then poured into a steel mold to form a rectangular glass slab having dimensions of about 8"×4"×0.5", and that slab was annealed overnight at 300° C.

Whereas the above description reflects laboratory melting and forming procedures only, it must be appreciated that the recorded compositions are capable of being melted in commercial large scale melting units and shaped into articles of desired geometries employing forming techniques conventional in the glassmaking art.

TABLE I

| (Mole %) | | | | | | | | |
|---|---|---|---|---|---|---|---|---|
| | 1 | 2 | 3 | 4 | 5 | 6 | 7 | 8 |
| $P_2O_5$ | 33 | 32 | 35 | 33 | 33 | 33 | 32.5 | 32.5 |
| $Al_2O_3$ | 2 | 2 | 1 | 2 | 2 | 2 | 2.5 | 2.5 |
| $Li_2O$ | 9 | 11 | 22 | 10 | 10 | 10 | 10 | 11 |
| $Na_2O$ | 9 | 11 | — | 10 | 10 | 10 | 10 | 11 |
| ZnO | 48 | 44 | 42 | 45 | 40 | 45 | 45 | 43 |
| MgO | — | — | — | — | 2 | — | — | — |
| CaO | — | — | — | — | 3 | — | — | — |
| $AlF_3$ | — | — | 3 | — | — | 3 | — | — |
| | 9 | 10 | 11 | 12 | 13 | 14 | 15 | |
| $P_2O_5$ | 32.5 | 32.5 | 33 | 33 | 31 | 32 | 38 | |
| $Al_2O_3$ | 2.5 | 2.5 | 2 | 2 | 2 | — | 2 | |
| $Li_2O$ | 11 | 11 | 11 | 10 | 8 | 9 | 5 | |
| $Na_2O$ | 11 | 11 | 11 | 10 | 7 | 9 | 5 | |
| ZnO | 40 | 38 | 43 | 45 | 47 | 50 | 45 | |
| MgO | — | 2 | — | — | — | — | — | |
| CaO | 3 | 3 | — | — | — | — | — | |
| $AlF_3$ | — | — | 3 | — | — | — | — | |
| $K_2O$ | — | — | — | — | 5 | — | 5 | |
| $ZrO_2$ | — | — | — | 2 | — | — | — | |
| (Weight %) | | | | | | | | |
| | 1 | 2 | 3 | 4 | 5 | 6 | 7 | 8 |
| $P_2O_5$ | 48.7 | 48.7 | 52.9 | 49.5 | 50.3 | 48.3 | 48.8 | 49.2 |
| $Al_2O_3$ | 2.1 | 2.2 | 1.1 | 2.1 | 2.2 | 2.1 | 2.6 | 2.7 |
| $Li_2O$ | 2.8 | 3.5 | 6.9 | 3.2 | 3.2 | 3.1 | 3.2 | 3.5 |
| $Na_2O$ | 5.8 | 7.3 | — | 6.5 | 6.7 | 6.4 | 6.6 | 7.3 |
| ZnO | 40.6 | 38.3 | 36.4 | 38.6 | 35.0 | 37.7 | 38.8 | 37.3 |
| MgO | — | — | — | — | 0.9 | — | — | — |
| CaO | — | — | — | — | 1.8 | — | — | — |
| $AlF_3$ | — | — | 2.7 | — | — | 2.6 | — | — |
| | 9 | 10 | 11 | 12 | 13 | 14 | 15 | |
| $P_2O_5$ | 49.7 | 50.0 | 48.5 | 48.2 | 46.0 | 48.1 | 53.0 | |
| $Al_2O_3$ | 2.7 | 2.8 | 2.1 | 2.1 | 2.1 | — | 2.0 | |
| $Li_2O$ | 3.5 | 3.6 | 3.4 | 3.1 | 2.5 | 2.9 | 1.5 | |
| $Na_2O$ | 7.3 | 7.4 | 7.1 | 6.4 | 4.5 | 5.9 | 3.0 | |
| ZnO | 35.0 | 33.5 | 36.3 | 37.7 | 40.0 | 43.1 | 35.9 | |
| MgO | — | 0.9 | — | — | — | — | — | |
| CaO | 1.8 | 1.8 | — | — | — | — | — | |
| $AlF_3$ | — | — | 2.6 | — | — | — | — | |
| $K_2O$ | — | — | — | — | 4.9 | — | 4.6 | |
| $ZrO_2$ | — | — | — | 2.5 | — | — | — | |

Samples having the approximate dimensions of 35×25×15 mm were cut from each glass slab, and thereafter each was ground and polished for testing the chemical durability thereof. Those samples plus the remainder of each glass slab were placed inside an electrically-heated furnace. Whereas more rapid or slower rates of heating can be employed, as a matter of convenience the temperature within the furnace was raised at a rate of about 5° C./minute to the temperature recorded in Table II, and held at that temperature for the period of time also recorded in Table II. Thereafter, the electric current to the furnace was cut off and the furnace allowed to cool to room temperature with the samples retained therein. This latter practice is termed "cooling at furnace rate," and averages about 2°–3° C./minute.

Table II also records a visual description of the appearance of the glass-ceramic, a qualitative characterization of the crystallization as determined over a broken cross section of the glass-ceramic, and the results of testing the chemical durability thereof. In the latter test, each of the ground and polished samples as a glass-ceramic was carefully weighed and then placed in an autoclave. The temperature within the autoclave was raised to 150° C. and a steam atmosphere of 69 psi ($\approx 4.9$ kg/cm$^2$) generated. After an exposure of 4 hours, the sample was removed from the autoclave, dried in the ambient environment, and again weighed to measure the percent weight change, which value is recited in Table II. Comparisons in chemical durability with the precursor glass are also reported.

TABLE II

| Ex. | Heat Treat. | Appearance | Crystallization | Weight Change |
|---|---|---|---|---|
| 1 | 450° C. - 16 hrs. | Cream-colored | Medium-grained | +0.2% vs. +1.7% in glass; glass frosted |
| 2 | 450° C. - 1 hr. | Cream-colored | Medium-grained | — |
| 3 | 425° C. - 1 hr. | Cream-colored | Fine-grained, Cherty fracture | — |
| 4 | 450° C. - 1 hr. | Cream-colored | Fine-grained, Cherty fracture | +0.5% vs. +1.1% in glass |
| 5 | 425° C. - 1 hr. | Cream-colored | Fine-grained, Cherty fracture | — |
| 6 | 450° C. - 1 hr. | Cream-colored | Fine-grained, Cherty fracture | +0.2% vs. +2.1% in glass; glass frosted |
| 7 | 450° C. - 1 hr. | Cream-colored | Medium-grained Cherty fracture | +0.7%, slight frost; +2.3% with heavy frost in glass |
| 8 | 425° C. - 1 hr. | Cream-colored | Medium-grained, Cherty fracture | — |
| 9 | 425° C. - 1 hr. | Cream-colored | Medium-grained, Cherty fracture | — |
| 10 | 425° C. - 1 hr. | Cream-colored | Medium-grained, Cherty fracture | — |
| 11 | 425° C. - 1 hr. | Cream-colored | Medium-grained, Cherty fracture | +0.8% vs. +1.3% in glass; glass frosted |
| 12 | 425° C. - 1 hr. | Cream-colored | Fine-grained, Cherty fracture | — |
| 13 | 450° C. - 1 hr. | Cream-colored | Fine-grained Cherty fracture | — |
| 14 | 425° C. - 1 hr. | | Did not crystallize | |
| 14 | 450° C. - 1 hr. | | Did not crystallize | |
| 15 | 425° C. - 1 hr. | | Did not crystallize | |
| 15 | 450° C. - 1 hr. | | Did not crystallize | |

TABLE II-continued

| Ex. | Heat Treat. | Appearance | Crystallization | Weight Change |
|---|---|---|---|---|
| | 1 hr. | | crystallize | |

Examples 14 and 15 are illustrative of the need to maintain the compositions within the required parameters. Examples 1, 4, 6, 7, and 11 demonstrate the improved resistance to moisture attack which the glass-ceramics of the present invention exhibit compared with their precursor glasses. Hence, a weight change of no more than about 1% will customarily be exhibited by the inventive glass-ceramics.

The annealing point of the precursor glass of Example 1 was measured at 355° C., whereas the apparent annealing point of the glass-ceramic body resulting from heat treating the glass at 450° C. for 16 hours, as determined through differential thermal analysis, was 575° C. The annealing point of the precursor glass of Example 11 was measured at 325° C., whereas the apparent annealing point of the glass-ceramic body resulting from heat treating the glass at 450° C. for 1 hour, again determined through differential thermal analysis, was 560° C. As can be observed, the apparent annealing point of each glass-ceramic was more than 200° C. higher than the annealing point of the parent glass.

Their exceptionally high resistance to moisture attack, coupled with their relatively high apparent annealing point, recommends these glass-ceramics for a broad range of applications including food preparation and service. Furthermore, because the viscosity relationships exhibited by the precursor inventive glasses at relatively low working temperatures render them capable of being shaped into articles of complex configurations through extrusion, injection molding, and other techniques conventionally employed in the plastic forming art, the range of products for which the inventive glass-ceramics are useful is greatly broadened.

We claim:

1. A glass-ceramic exhibiting an apparent annealing point greater than 400° C. and excellent resistance to moisture attack, said glass-ceramic consisting essentially, expressed in terms of mole percent on the oxide basis, of:

| | | | |
|---|---|---|---|
| Li$_2$O | 5-25 | ZnO | 35-50 |
| Na$_2$O | 0-15 | Al$_2$O$_3$ | 0.75-6 |
| K$_2$O | 0-10 | P$_2$O$_5$ | 29-37. |
| Li$_2$O + Na$_2$O + K$_2$O | 5-25 | | |

2. A glass-ceramic according to claim 1 also containing up to 5% total of at least one nucleating agent selected from the group consisting of AlF$_3$, TiO$_2$, and ZrO$_2$.

3. A glass-ceramic according to claim 1 also containing up to 20% total of at least one member of the group in the indicated proportion of up to 10% total CaO, MgO, and/or MnO, up to 15% total Cu$_2$O, PbO, and/or SnO, and up to 3% SiO$_2$.

4. A glass-ceramic according to claim 3 wherein the total of CaO, MgO, MnO, Cu$_2$O, PbO, and SiO$_2$ does not exceed 10%.

* * * * *